(12) United States Patent
Shapira et al.

(10) Patent No.: US 7,596,506 B2
(45) Date of Patent: *Sep. 29, 2009

(54) METHOD AND APPARATUS FOR EVALUATING VISITORS TO A WEB SERVER

(75) Inventors: Elijahu Shapira, Portland, OR (US); David S. Montgomery, Camas, WA (US); W. Glen Boyd, Portland, OR (US)

(73) Assignee: WebTrends, Inc., Portland, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/114,640

(22) Filed: Apr. 25, 2005

(65) Prior Publication Data
US 2005/0256951 A1      Nov. 17, 2005

Related U.S. Application Data

(63) Continuation of application No. 09/240,208, filed on Jan. 29, 1999, now Pat. No. 6,925,442.

(51) Int. Cl.
G06F 17/50     (2006.01)
(52) U.S. Cl. .................................................... 705/10
(58) Field of Classification Search ................... 705/10, 705/14; 709/223, 224
See application file for complete search history.

(56) References Cited

U.S. PATENT DOCUMENTS

| | | | |
|---|---|---|---|
| 5,600,632 A | 2/1997 | Schulman | 370/252 |
| 5,675,510 A | 10/1997 | Coffey et al. | 364/514 A |
| 5,689,416 A | 11/1997 | Shimizu et al. | 364/185 |
| 5,706,436 A | 1/1998 | Lewis et al. | 395/200.11 |
| 5,724,521 A | 3/1998 | Dedrick | |
| 5,727,129 A | 3/1998 | Barrett et al. | 395/12 |
| 5,732,218 A | 3/1998 | Bland et al. | 395/200.54 |
| 5,774,660 A | 6/1998 | Brendel et al. | 395/200.31 |
| 5,774,716 A | 6/1998 | Harbinski et al. | 395/618 |
| 5,787,253 A | 7/1998 | McCreery et al. | 395/200.61 |
| 5,796,942 A | 8/1998 | Esbensen | 395/187.01 |

(Continued)

FOREIGN PATENT DOCUMENTS

WO      WO 98/38614      9/1998

(Continued)

OTHER PUBLICATIONS

Proquest (High level of interest seen in Ford, Cruiser auto shows), Jun. 1994, p. 1-2.*

(Continued)

*Primary Examiner*—Romain Jeanty
(74) *Attorney, Agent, or Firm*—Marger Johnson & McCollom, P.C.

(57) ABSTRACT

Different web pages on a web server are associated with different qualification profiles, each of which is assigned a value by the web-site proprietor. Traffic data hits at the web-site are analyzed to determine which web pages the visitor viewed on the web server. Each qualifying visitor is thereafter associated with a qualification profile and a corresponding value. In another aspect of the invention, visitors arriving as a result of an advertisement on a remote web-site are tracked. The web-site proprietor is consequently able to determine a return on advertising investment based on the value of visitors brought to the site by the tracked advertisement.

10 Claims, 9 Drawing Sheets

U.S. PATENT DOCUMENTS

| | | | | |
|---|---|---|---|---|
| 5,796,952 | A | 8/1998 | Davis et al. | 395/200.54 |
| 5,870,559 | A | 2/1999 | Leshem et al. | 395/200.54 |
| 5,878,223 | A | 3/1999 | Becker et al. | 395/200.53 |
| 5,892,917 | A | 4/1999 | Myerson | 395/200.54 |
| 5,898,837 | A | 4/1999 | Guttman et al. | 395/200.54 |
| 5,905,988 | A * | 5/1999 | Schwartz et al. | 707/104.1 |
| 5,929,848 | A * | 7/1999 | Albukerk et al. | 715/700 |
| 5,954,798 | A | 9/1999 | Shelton et al. | 709/224 |
| 5,958,008 | A | 9/1999 | Pogrebisky et al. | 709/223 |
| 5,968,125 | A | 10/1999 | Garrick et al. | 709/224 |
| 5,974,572 | A | 10/1999 | Weinberg et al. | 714/47 |
| 5,996,007 | A | 11/1999 | Klug et al. | 709/218 |
| 6,016,475 | A | 1/2000 | Miller et al. | 705/1 |
| 6,018,619 | A | 1/2000 | Allard et al. | 395/200.54 |
| 6,023,744 | A | 2/2000 | Shoroff et al. | 711/4 |
| 6,055,572 | A | 4/2000 | Saksena | 709/224 |
| 6,078,928 | A * | 6/2000 | Schnase et al. | 707/104.1 |
| 6,098,079 | A | 8/2000 | Howard | 707/205 |
| 6,112,238 | A * | 8/2000 | Boyd et al. | 709/224 |
| 6,112,240 | A | 8/2000 | Pogue et al. | 709/224 |
| 6,128,624 | A | 10/2000 | Papierniak et al. | 707/104 |
| 6,366,956 | B1 * | 4/2002 | Krishnan | 709/223 |
| 6,393,407 | B1 | 5/2002 | Middleton et al. | 705/14 |
| 6,460,036 | B1 * | 10/2002 | Herz | 707/10 |
| 6,571,279 | B1 * | 5/2003 | Herz et al. | 709/217 |
| 6,701,362 | B1 * | 3/2004 | Subramonian et al. | 709/224 |

FOREIGN PATENT DOCUMENTS

| | | |
|---|---|---|
| WO | WO 00/10093 | 2/2000 |
| WO | WO 00/45264 | 8/2000 |

OTHER PUBLICATIONS

*WebTrends™ Essential Reporting for your Web Server*, Installation and User Guide, Oct. 1996 Edition, by e.g. Software, Inc., 62 page manual.

Software Patent Institute Database of Software Technologies, Dataflow Sorting [From V Programming] pp. 140-143 by William W. Wadge & Edward A. Ashcroft.

* cited by examiner

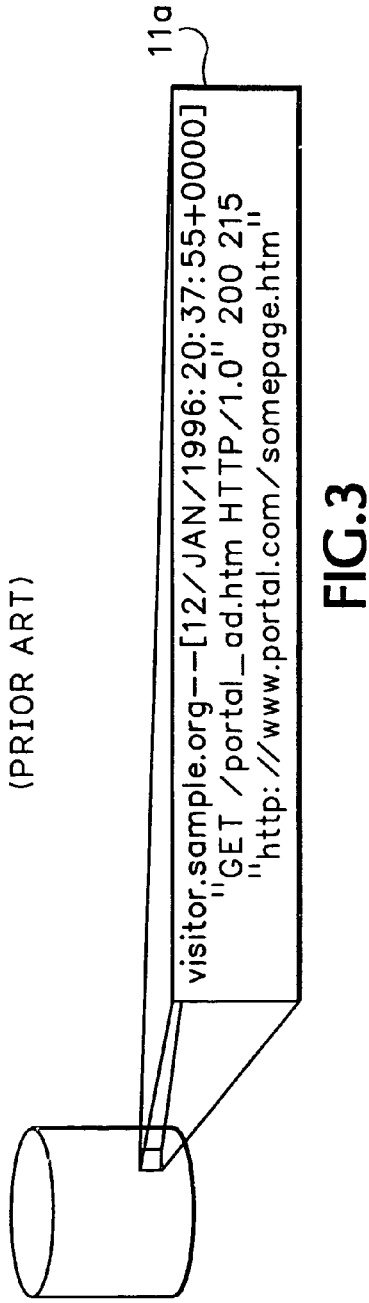
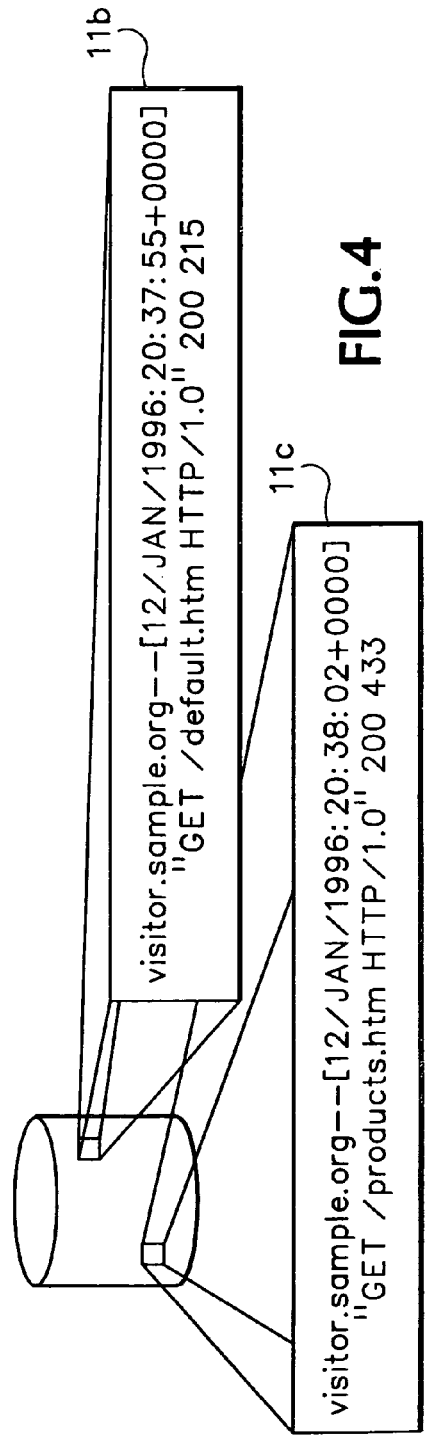

METHOD AND APPARATUS FOR EVALUATING VISITORS TO A WEB SERVER

CROSS REFERENCE TO RELATED APPLICATIONS

This application is a continuation of U.S. patent application Ser. No. 09/240,208, filed Jan. 29, 1999, now U.S. Pat. No. 6,925,442.

BACKGROUND OF THE INVENTION

The present invention relates generally to web-server traffic data analysis and more particularly to a system and method for determining the value of visitors to a web site.

The worldwide web (hereinafter "web") is rapidly becoming one of the most important publishing mediums today. The reason is simple: web servers interconnected via the Internet provide access to a potentially worldwide audience with a minimal investment in time and resources in building a web site. The web server makes available for retrieval and posting a wide range of media in a variety of formats, including audio, video and traditional text and graphics. And the ease of creating a web site makes reaching this worldwide audience a reality for all types of visitors, from corporations, to startup companies, to organizations and individuals.

This recent growth of the Internet over the past few years has opened new markets for business. Individuals use the Internet for everything from buying new cars to ordering a pizza to hiring a plumber. The ease with which people can use the Internet for such activities has spurred businesses to offer the services and products people desire on the Internet.

Unlike other forms of media, a web site is interactive, and the web server can passively gather access information about each visitor by observing and logging the traffic data exchanged between the web server and the visitor. Important facts about the visitors can be determined directly or inferentially by analyzing the traffic data and the context of the "hit." Moreover, traffic data collected over a period of time can yield statistical information, such as the number of visitors visiting the site each day, what countries, states or cities the visitors connect from, and the most active day or hour of the week. Such statistical information is useful in tailoring marketing or managerial strategies to better match the apparent needs of the audience. Each hit is also encoded with the date and time of the access.

Visitors to a web site are not of uniform interest to the site operator. For example, a relatively low quality visitor might be one that merely reads the home page of the site and moves on. A higher quality visitor might be one that locates, e.g., a product description page, and an even higher quality visitor might be one who visits the price page. The highest quality visitor is, of course, one that orders and pays for goods or services offered by the web site.

Visitors may be induced to visit a web site via advertisements placed on remote web sites. One common way to advertise on the Internet is with banner ads. A banner ad shows a picture or statement of a business's products and services and allows a visitor to click on the ad to visit the web site hosted by the business. The visit may be to obtain more information, or, as is hoped by the business, to effect a purchase of a product or service via the web site.

The problem with Internet advertising is measuring its effectiveness. Internet advertising campaigns vary in price, depending on several factors such as where the ad is to be placed and the expected viewing population. One advertising campaign might cost a business, for example, $1,000.00 to be on display for one month at one site, whereas the same ad might cost only $500.00 at another site. Further, it has been difficult to determine exactly how many visitors an advertising campaign generated. In the above example, the $500.00 advertising campaign might have generated 10,000 visits in the month the ad was up, whereas the $1,000.00 advertising campaign might have generated only 7,000 visits a month. Finally, the value an advertising campaign generates is a function of what happens after the visitors visit the site. In the above example, although the $500.00 advertising campaign generated more hits, if none of those visitors made any purchase of the business's products or services, their collective value would be close to $0.00. On the other hand, although the $1,000.00 advertising campaign generated fewer hits, those visitors might all have purchased products or services, making their collective value at least several hundreds of thousands of dollars. It is this difficulty in gauging the effectiveness of advertising campaigns that makes their use a gamble. Accordingly, there remains a need for a way to analyze the effectiveness of advertising campaigns to determine their relative worth.

It would be desirable to analyze the information gathered by the web server to determine the quality of visitors to the web site.

It would also be desirable for the site operator to use the determined visitor quality to analyze the effectiveness of the operator's advertising.

SUMMARY OF THE INVENTION

A business owner indicates what advertising campaigns that are run for the web site of interest. The business owner also constructs profiles that define products or services the business owner wants to sell, and assigns each profile a value. The software then analyzes the web site's log files (which track every exchange of traffic data between the web site and other computers over the Internet) and matches visitors with both an advertising campaign and a profile. Finally, the software sums the value for each visitor matched with an advertising campaign according to the profiles with which the visitor is matched.

One object of the present invention is to allow an Internet business owner a way to track the value of visitors who visit the web site.

Another object of the present invention is to allow an Internet business owner a way to calculate the return on investment for each advertising campaign the business owner is currently running.

The foregoing and other objects, features, and advantages of the present invention will become more readily apparent from the following detailed description of a preferred embodiment that proceeds with reference to the drawings.

BRIEF DESCRIPTION OF THE DRAWINGS

FIG. 2 shows a prior art format used in recording a "hit" of traffic data received by the server of FIG. 1.

FIGS. 3 and 4 illustrate hits memorialized in the log file of the server in FIG. 1.

DETAILED DESCRIPTION OF THE PREFERRED EMBODIMENT

Figure 1:
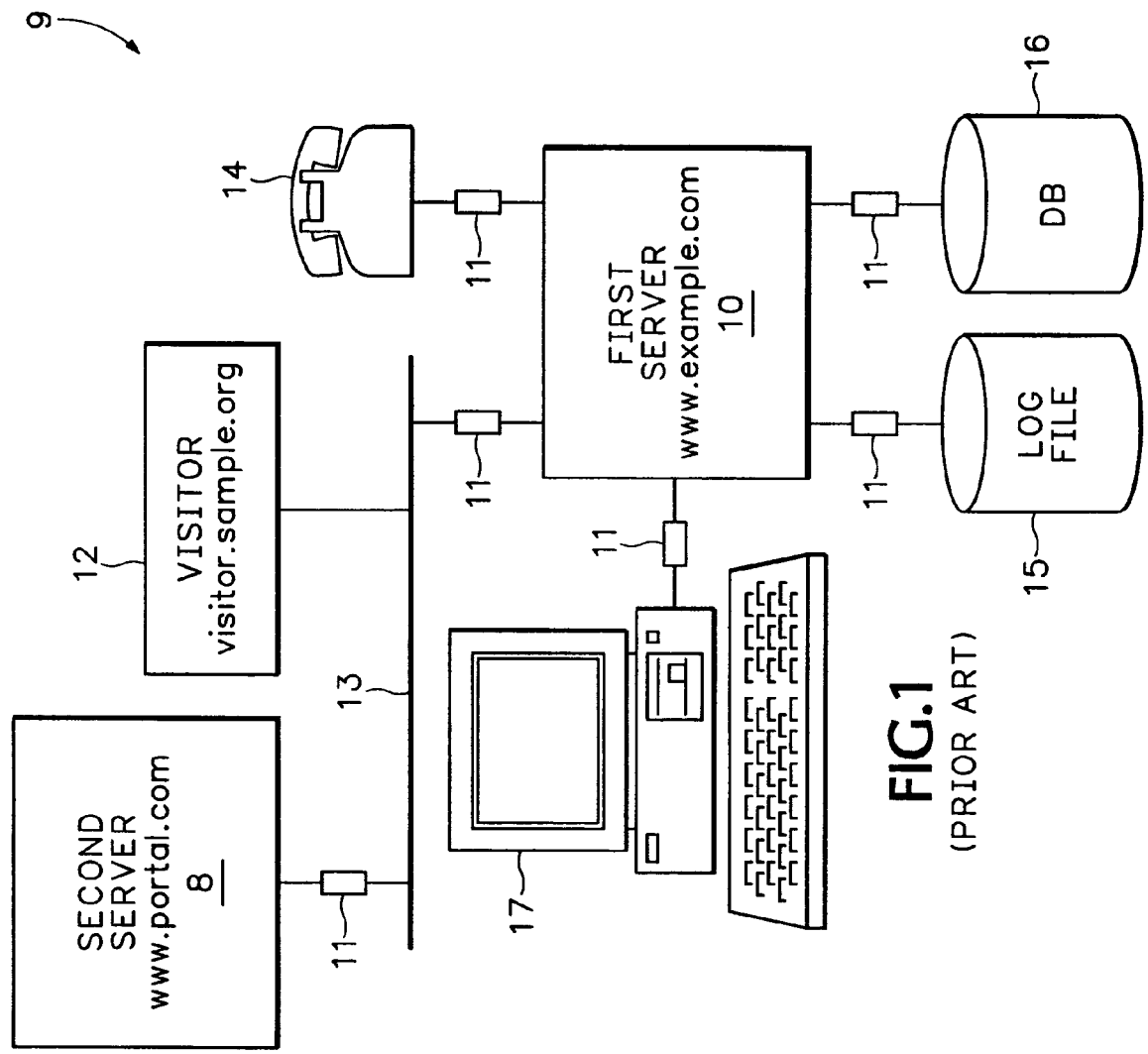
FIG. 1 shows the communication between a remote visitor, a first web site, and a second web site, where the second web site refers the visitor to the first web site.

FIG. 1 is a functional block diagram of a prior art system for analyzing traffic data in a distributed computing environment 9. It is more fully described in "WebTrends Installation and Visitor Guide," version 2.2, October 1996, and in U.S. patent application Ser. No. 08/801,707, filed on Feb. 14, 1997, the disclosures of which are incorporated herein by reference for all purposes. WebTrends is a trademark of WebTrends Corporation, Portland, Oreg.

A first server 10 provides web site and related services to remote visitors. By way of example, the remote visitors can access the server 10 from a remote computer system 12 interconnected with the server 10 over a network connection 13, such as the Internet or an intranet, a dial up (or point-to-point) connection 14 or a direct (dedicated) connection 17. Other types of remote access connections are also possible.

Each request by a remote visitor to the server 10—and the reply thereto—comprises a "hit" of raw traffic data 11. The format used in recording each traffic data hit 11 and an example of a traffic data hit 11 are described below with reference to FIGS. 2-4. The server 10 preferably stores each traffic data hit 11 in a log file 15, although a database 16 or other storage structure can be used. The present invention can be implemented using any source of traffic data hits.

The present embodiment of the invention is implemented in part via a computer program run on server 10. It should be appreciated, however, that the invention could be implemented as well by a program operating on a different computer, such as a work station connected to server 10 or a computer connected to server 10 via an intranet or other network. As will shortly be seen, the computer implementing the invention need not even be connected to the server; it is necessary only that the traffic data hits generated by the server be accessible by the computer implementing the invention. For example, the computer implementing the invention could monitor and process the traffic directly with network connection 13.

Five sources of traffic data hits 11 (remote system or visitor 12, dial-up connection 14, log file 15, database 16 and direct connection 17) are shown. Other sources are also possible. The traffic data hits 11 can originate from any single source or from a combination of these sources. The program examines each traffic data hit 11 and analyzes the access information obtained from the traffic data in a manner later described in more detail.

In the described embodiment, the server 10 is typically an Intel Pentium-based computer system equipped with a processor, memory, input/output interfaces, a network interface, a secondary storage device and a user interface, preferably such as a keyboard and display. The server 10 typically operates under the control of either the Microsoft Windows NT or Unix operating systems and executes either Microsoft Internet Information Server or NetScape Communications Server software. Pentium, Microsoft, Windows, Windows NT, Unix, Netscape and Netscape Communications Server are trademarks of their respective owners. However, other server 10 configurations varying in hardware, such as DOS-compatible, Apple Macintosh, Sun Workstation and other platforms, in operating systems, such as MS-DOS, Unix and others, and in web software are also possible. Apple, Macintosh, Sun and MS-DOS are trademarks of their respective owners.

A second server 8 also provides web site and related services to remote visitors such as visitor 12. It is constructed and operates in substantially the same manner as first server 10 and can be accessed in the same fashion.

The present invention is preferably implemented as a computer program executed by the server 10 and embodied in a storage medium comprising computer-readable code. In the described embodiment, the program is written in the C programming language, although other programming languages are equally suitable. It operates in a Microsoft Windows environment and can analyze Common Log File, Combined Log File and proprietary log file formats from industry standard web servers, such as those licensed by NetScape, NCSA, O'Reilly WebSite, Quarterdeck, C-Builder, Microsoft, Oracle, EMWAC, and other Windows 3.x, Windows NT 95, Unix and Macintosh Web servers.

FIG. 2 shows a format used in storing a "hit" of raw traffic data 11 received by the server of FIG. 1. A raw traffic data hit 11 is not in the format shown in FIG. 2. Rather, the contents of each field in the format is determined from the data exchanged between the server 10 and the source of the traffic data hit 11 and the information pulled from the data is stored into a data hit using the format of FIG. 2 prior to being stored in the log file 15 (shown in FIG. 1) or processed.

Each traffic data hit 11 is a formatted string of ASCII data. The format is based on the standard log file format developed by the National Center for Supercomputing Applications (NCSA), the standard logging format used by most web servers. The format consists of seven fields as follows:

| Field Name | Description |
| --- | --- |
| Visitor Address (30): | Internet protocol (IP) address or domain name of the visitor accessing the site. |
| RFC931 (31): | Obsolete field usually left blank, but increasingly used by many web servers to store the host domain name for multi-homed log files. |
| Visitor Authentication (32): | Exchanges the visitor name if required for access to the web site. |
| Date/Time (33): | Date and time of the access and the time offset from GMT. |
| Request (34): | Either GET (a page request) or POST (a form submission) command. |
| Return Code (35): | Return status of the request which specifies whether the transfer was successful. |
| Transfer Size (36): | Number of bytes transferred for the file request, that is, the file size. |

In addition, three optional fields can be employed as follows:

| Field Name | Description |
| --- | --- |
| Referring URL (37): | URL used to obtain web site information for performing the "hit." |
| Agent (38): | Browser version, including make, model or version number and operating system. |
| Cookie (39): | Unique identifier permissively used to identify a particular visitor. |

Other formats of traffic data hits 11 are also possible, including proprietary formats containing additional fields, such as time to transmit, type of service operation and others. Moreover, modifications and additions to the formats of raw traffic data hits 11 are constantly occurring and the extensions required by the present invention to handle such variations of the formats would be known to one skilled in the art.

In operation, remote visitor 12, whose Internet address might be visitor.sample.org, clicks on a link to request a web page from the second web server 8, whose Internet address might be www.portal.com. (Another name for a web page address in Internet parlance is Universal Resource Locator, or URL.) This click generates a traffic data hit consisting of a reply. In this case, the traffic data hit is a request for the second web server 8 to provide to the remote visitor 12 the web page http://www.portal.com/somepage.htm. Since the remote visitor 12 generated the request, the traffic data hit is a "GET" command. Upon receiving the traffic data hit, the second web server 8 sends a reply back to the remote visitor 12 consisting of an "OK" message and the requested web page. The computer of visitor 12 then displays the requested web page http://www.portal.com/somepage.htm on the remote visitor's 12 browser.

Somewhere on the provided web page might be an advertisement for the first web server, whose Internet address is www.example.com. This advertisement is an advertising campaign run by the first web server 10. If the remote visitor is interested in finding out more about the products or services advertised, she might then click on the advertisement, which includes a link that redirects the visitor to the first web server 10. This generates a second request for a web page. This request is directed to the first web server 10. By clicking on the advertisement, the visitor requests the first web server 10 to provide the web page http://www.example.com/portal_ad.htm via a second traffic data hit 11$a$, shown in FIG. 3. It should be clear that the requested web page http://www.example.com/portal_ad.htm in traffic data hit 11$a$ is on the first web server 10, and not on the second web server 8. Upon receiving the traffic data hit 11$a$ requesting web page http://www.example.com/portal_ad.htm, the first web server 10 sends data back to the remote visitor 12 containing an "OK" message and the requested web page. The first web server also writes an entry in its log file memorializing the request for web page http://www.example.com/portal_ad.htm. This entry 11$a$ stores several important pieces of information. Entry 11$a$ stores the remote visitor's Internet address (visitor.sample.org), the time and date of the request ([Jan. 12, 1996:20:37:55 +0000], or Jan. 12, 1996, at 8:37:55 PM, Greenwich Mean Time), the request issued by the remote visitor 12 ("GET/portal_ad.htm HTTP/1.0"), and the referring URL (http://www.portal.com/somepage.htm). (Note that, although it is not shown, the second web server 8 can also create its own log file entries similar to those of log file 15.)

After being referred to server 10 as described above, remote visitor 12 visits several pages on server 10. In FIG. 4, hits are depicted that represent visits by the remote visitor, whose Internet address is visitor.sample.org, to these pages on server 10. The remote visitor 12 first generates a traffic data hit 11$b$, requesting the web page default.htm. When the web server 10 receives the traffic data hit 11$b$, the web server replies by sending data containing a response message, along with the requested web page default.htm. The web server also writes entry 11$b$ into its log file 15. The log file entry 11$b$ indicates remote visitor's 12 request for the web page default.htm.

A little while later, the remote visitor 12 requests web page products.htm in traffic data hit 11$c$. The web server 10 receives the traffic data hit 11$c$ and sends back data containing a response message and the requested web page products.htm. The web server 10 also writes another entry 11$c$ into the log file 15. This log file entry 11$c$ indicates the remote visitor's request for the web page products.htm.

Figure 5:
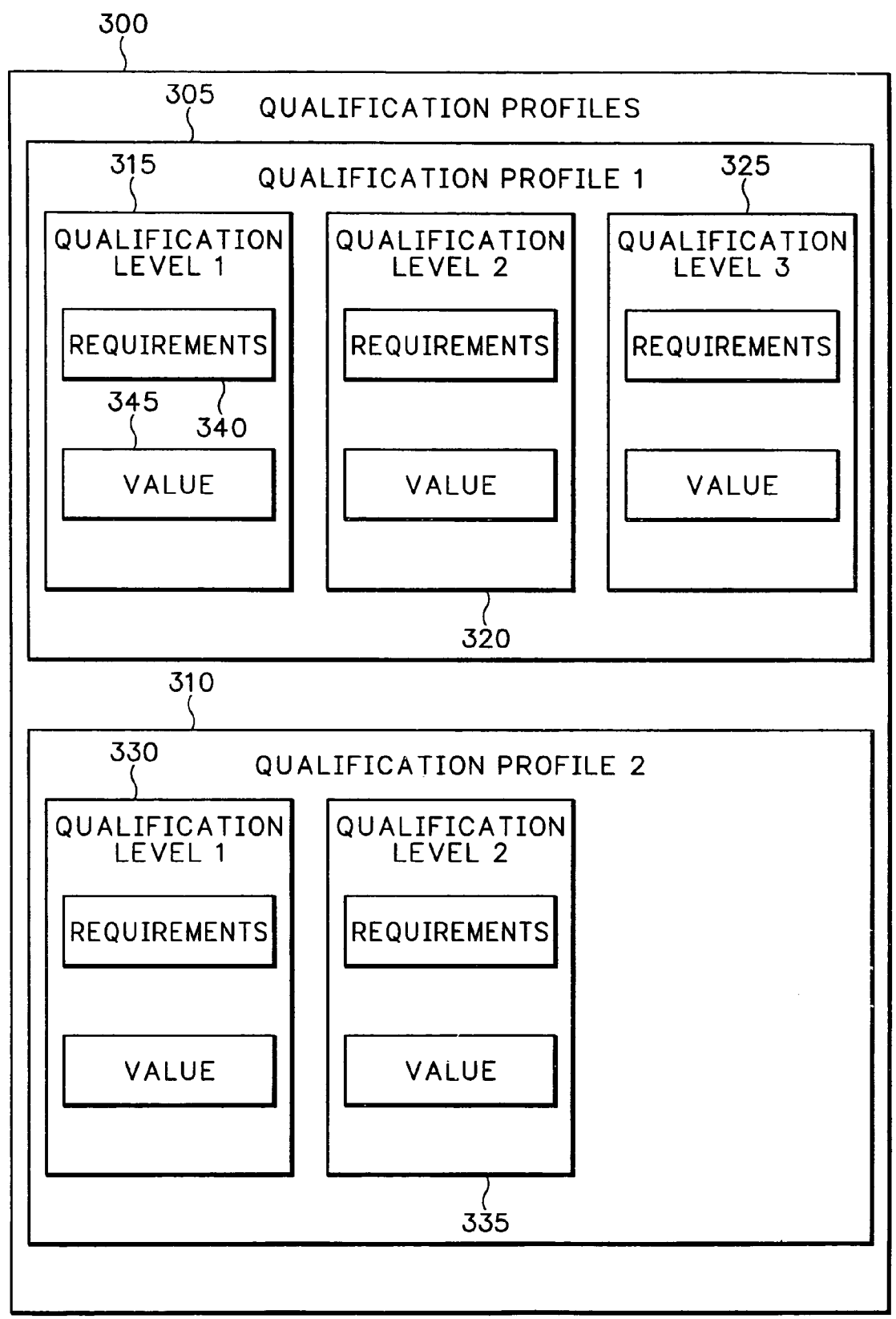
FIGS. 5 and 6 show an embodiment for data structures that store qualification profiles and advertising campaigns.

FIG. 5 shows an embodiment for the qualification profiles. Generally speaking, a qualification profile comprises predetermined activity at a web site. It is used to correlate a pattern of activity with a value. The pattern of activity could indicate a level of interest in a product or service offered at the web site. In FIG. 5, the qualification profile data structure 300 is shown holding two qualification profiles 305 and 310; however, the invention can be implemented with any number of qualification profiles. The names for the qualification profiles are assigned by the site operator, and may be more meaningful than the arbitrary names Qualification profile 1 and Qualification profile 2 used here. For example, they might be the names of different products or classes of products offered for sale by the operator of the site on server 10. Qualification profile 305 includes three qualification levels 315, 320, and 325; qualification profile 310 includes two qualification levels 330 and 335. Each qualification level represents a different level of interest in the product or service represented by the qualification profile. Although the preferred embodiment has three qualification levels—fully qualified, moderately qualified, and minimally qualified—the invention may be implemented with any number, and as shown in FIG. 5, different qualification profiles can have different numbers of qualification levels.

As each qualification level includes the same type of information, only qualification level 315 will be discussed in greater detail, although FIG. 5 shows the detail for the other qualification levels 320, 325, 330, and 335. Qualification level 315 includes two elements: a set of requirements 340 (or entry criteria) a visitor must meet to qualify for the qualification level in that qualification profile, and a quantitative value 345 to assign to each visitor who qualifies for that qualification level. It should be appreciated that the value associated with a qualification level need not be quantitative: it may simply be inherent in the requirements of the qualification level.

The set of requirements 340 a visitor must meet to qualify for that qualification level in that qualification profile are very flexible. First, in the preferred embodiment, the sets of requirements 340 do not have to be related in any way. For example, it is not required that the set of requirements for qualification level 315 be a proper subset of the set of requirements for qualification level 325.

In the preferred embodiment, the sets of requirements 340 can be tied to web pages (or URLs) a visitor must visit. Requirements 340 could also be tied to the elapsed time the visitor spends at the site or on a particular page or group of pages, or to information submitted by a visitor in a form located on one of the web pages. Another example of requirements 340 includes visiting a content group, which is simply a collection of pages or a class of URLs. In addition, one of requirements 340 could be a return visit by a visitor. It should be appreciated that the site operator provides such information as the name of the qualification profiles 305 and 310, the chosen qualification levels 315, 320, 325, 330, and 335, the sets of requirements 340, and the qualitative value 345 to assign to each visitor who qualifies for the qualification level in that qualification profile.

Not shown in FIG. 5 is the nonqualified visitor value that is assigned to each visitor who does not qualify for any qualification profile.

Figure 6:
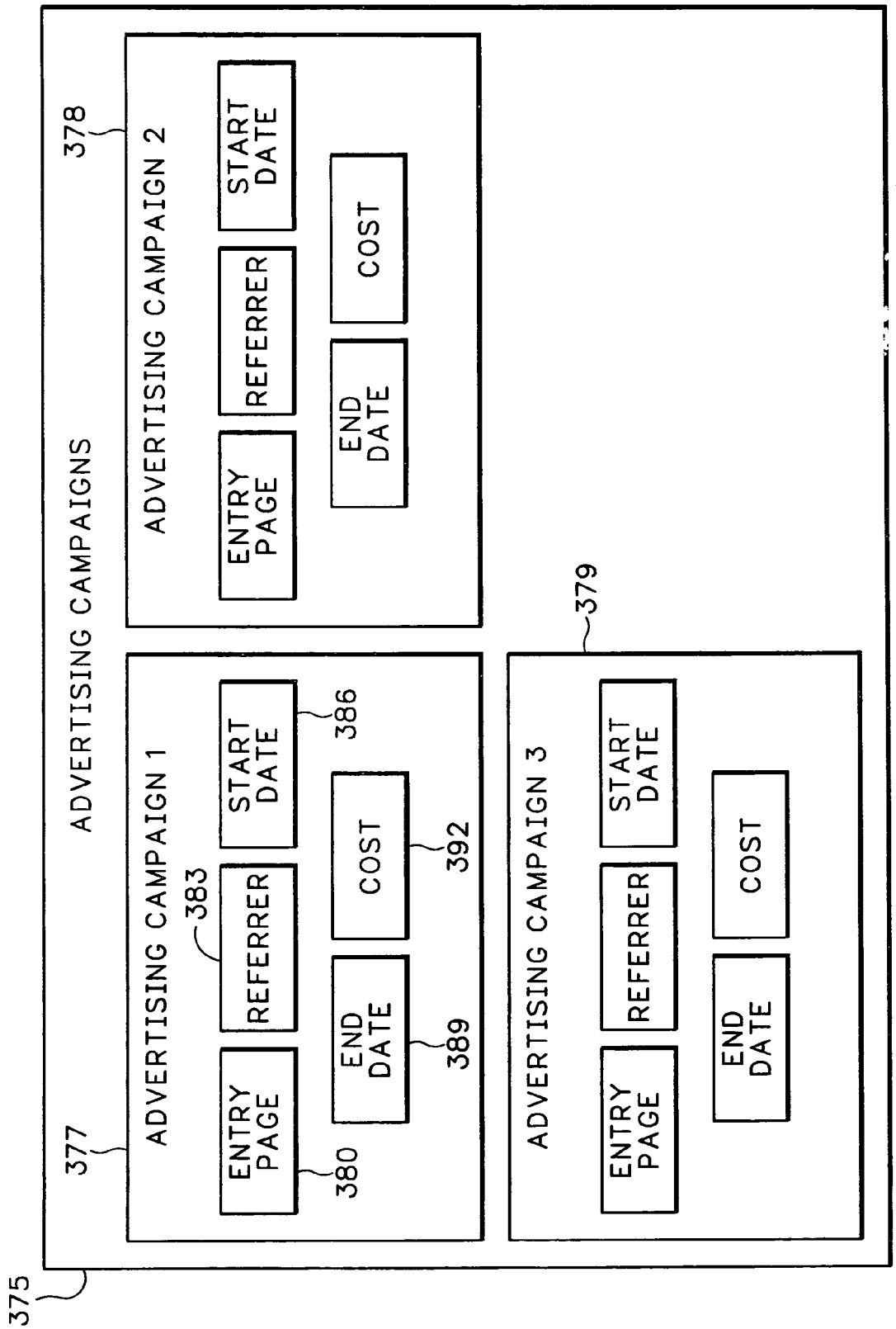

FIG. 6 shows a data structure for the advertising campaigns. In FIG. 6, the advertising campaign data structure 375 is shown holding three advertising campaigns 377, 378, and 379; however, there is no requirement that there be any particular number of advertising campaigns. The names for the advertising campaigns are assigned by the site operator, and may be more meaningful than the arbitrary names Advertising Campaign 1, Advertising Campaign 2, and Advertising Campaign 3 used here. For example, in the case of tracking banner advertisements that refer visitors from other web sites, the name of the referring site might be used. As each advertising campaign includes the same type of information, only advertising campaign 377 will be discussed in greater detail, although FIG. 6 shows the detail for the other advertising campaigns 378 and 379. Advertising campaign 377 includes five elements: an entry page 380 (an entry page is the first hit in a visitor session: in FIG. 1, the web page http://www.example.com/portal_ad.htm is the entry page), a referrer 383 (a referrer is a web page that links a visitor to the advertised web site: in FIG. 1, the web page http://www.portal.com/somepage.htm is the referrer), a start date 386 for the advertising campaign, an end date 389 for the advertising campaign, and a cost 392 for the advertising campaign during the period from the start date 386 to the end date 389. The entry page 380 and the referrer 383 help the program associate each visitor with an advertising campaign. To make it possible to distinguish between advertising campaigns, entry pages 380 and referrers 383 should be unique. Although not required, in the preferred embodiment the entry page 380 and the referrer 383 are mutually exclusive elements: the operator can assign only one of the two, and the other remains blank.

Figure 7:
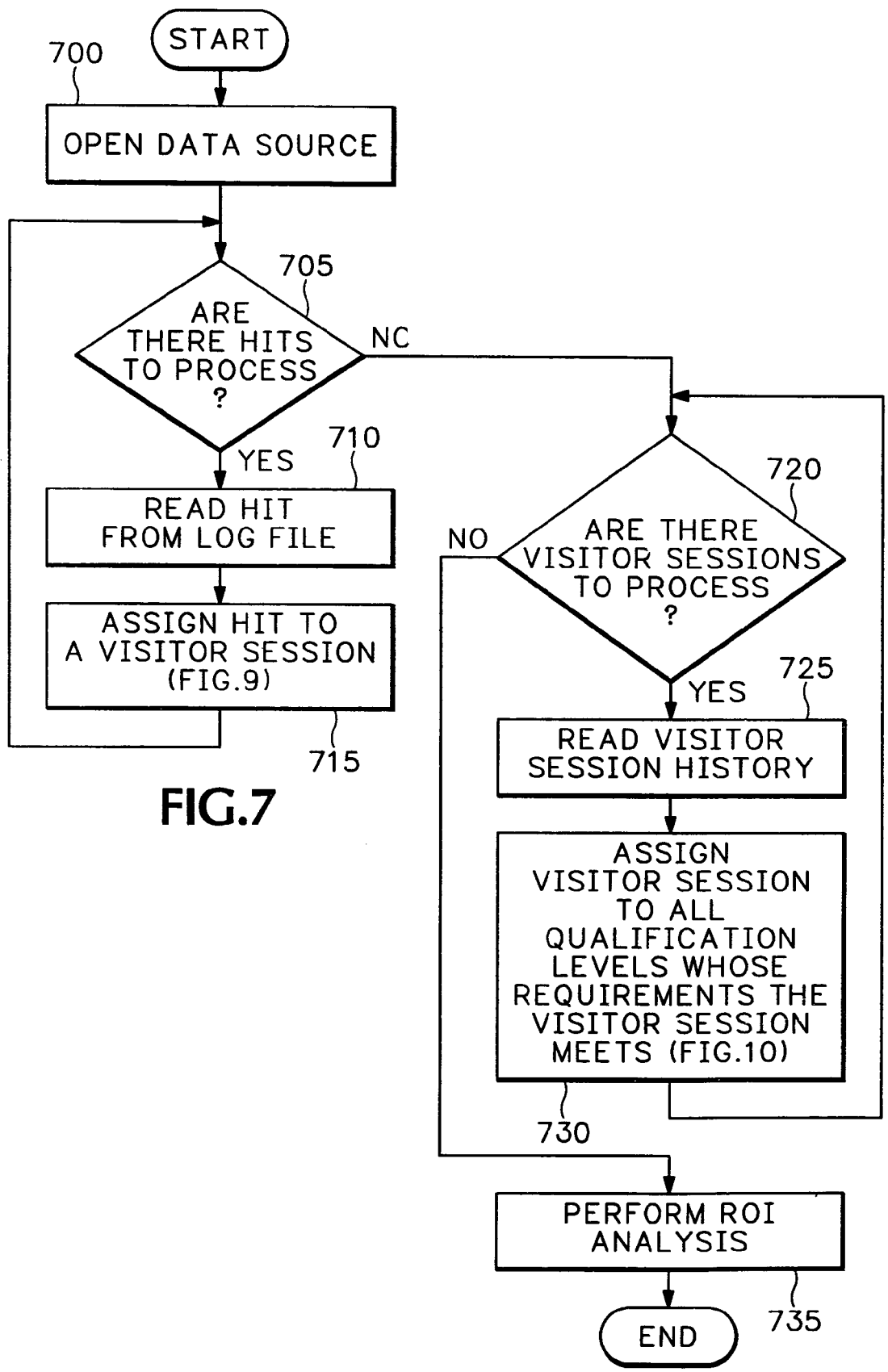
FIG. 7 shows a flow diagram for processing records of traffic data hits and calculating the return on investment for advertising campaigns in a first embodiment of the invention.

FIG. 7 illustrates a first embodiment of the invention. In FIG. 7, at step 700, a data source, such as a log file, is opened for reading. At step 705, the program checks to see if there are any hits left in the log file for processing. If there are, the next hit is read from the log file at step 710. At step 715, the current hit is assigned to a visitor session, described with reference to FIG. 8.

Figure 8:
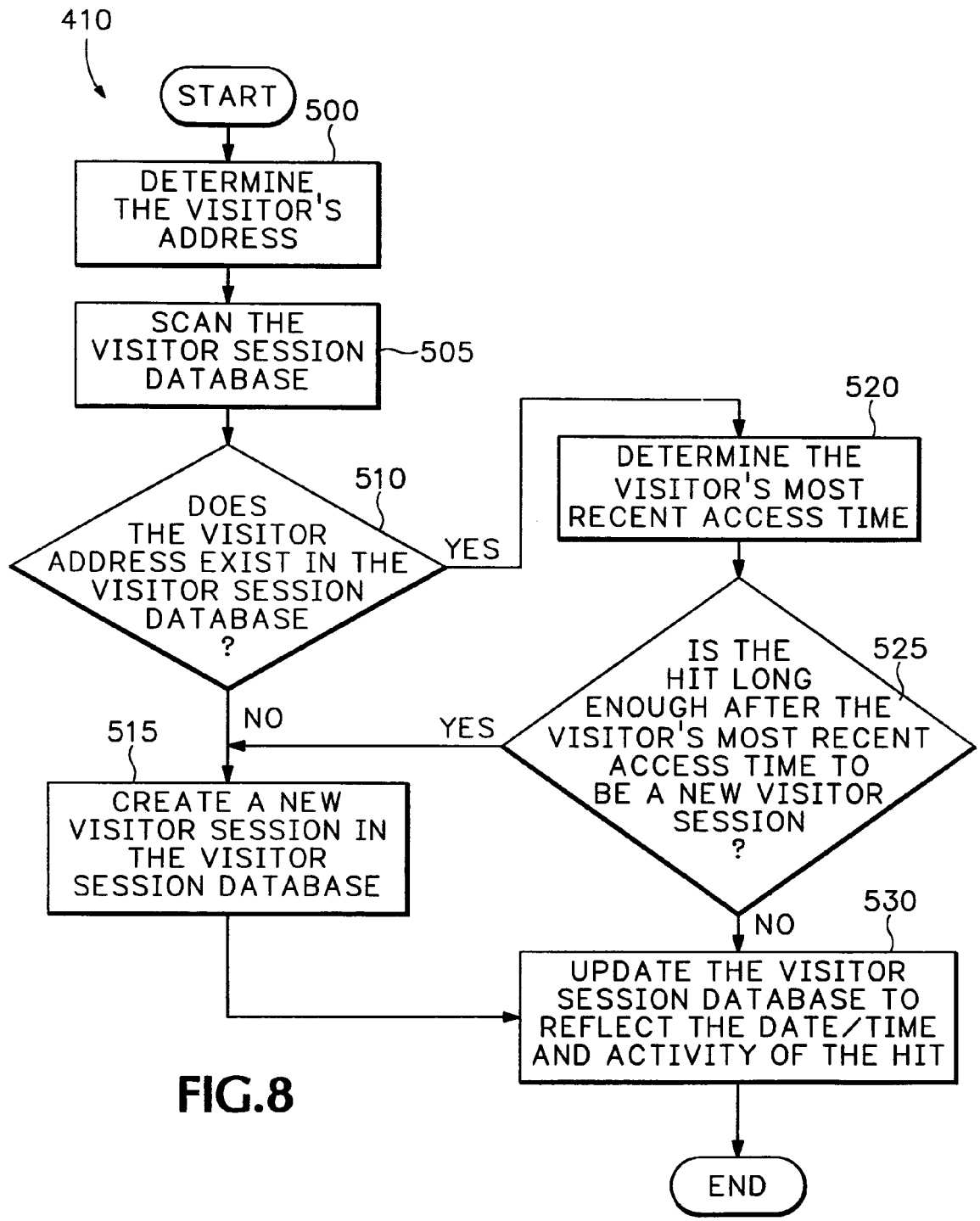
FIG. 8 shows a flow diagram for assigning a traffic data hit to a visitor session in the first embodiment.

Turning to FIG. 8, in step 500, the hit is analyzed to determine the address of the visitor who generated the hit. This information is easily determined, as the structure of the hit is well documented, as described above and depicted in FIGS. 2-4.

Still looking at FIG. 8, once the current hit's visitor address has been determined, at step 505 the program scans the visitor session database. A visitor session is a sequence of hits received from a single visitor. The sequence extends between the first hit until a predetermined time after the most recent hit has lapsed without further hits. Although the term visitor was used to describe the qualification profiles and ad campaigns with reference to FIGS. 5 and 6, the program in fact tracks visitor sessions. Each visitor session, of course , is associated with a single visitor. All visitor sessions are maintained in a database. At step 510 the program checks to see if the visitor address exists in the visitor session database. If the visitor address is new to the visitor session database, then at step 515 a new entry to the visitor session database is created, using the information from the hit (which includes what, if any, advertising campaign the visitor followed, discussed below). If the visitor address already existed at step 510, then at step 520 the date and time of the current hit are determined. At step 525 the program checks to see how long it has been since the visitor's last activity, i.e., since the last hit was received from that visitor. If it has been longer than the predetermined session time, then the session for that visitor is concluded. When the same visitor revisits the site after their session was concluded, then step 515 is performed and a new visitor record in the visitor database is created. But if the visitor session is still active, i.e., the predetermined time from the last hit has not lapsed when the next hit arrives, step 530 is performed and the visitor database is updated according to the current hit. This includes updating the visitor's last date and time of activity and updating the list of actions the visitor has performed.

After completion of the routine of FIG. 8, control then returns to step 705 in FIG. 7 to process additional hits as described above. If, however, there are no hits left in the log file for processing at step 705, control moves to step 720, where the program checks to see if there are any visitor sessions that need to be assigned to qualification profiles. If there are visitor sessions left to process, then step 725 reads the history for one of the remaining visitor sessions. Step 730, in a routine depicted in FIG. 9, then assigns the current visitor session to all qualification profiles for which it qualifies.

Figure 9:
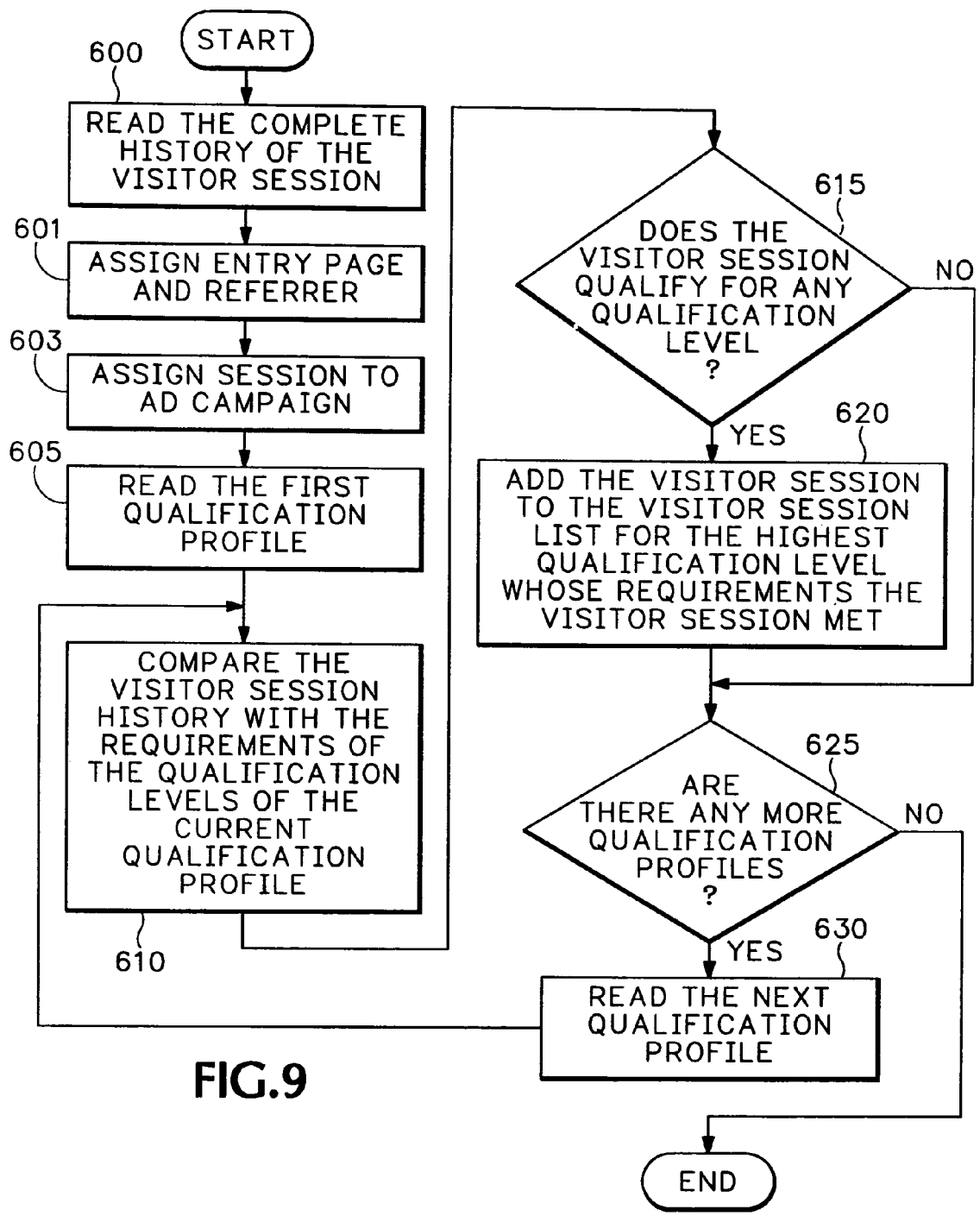
FIG. 9 shows a flow diagram for assigning visitor sessions to qualification profiles based on the visitor's activity in the first embodiment.

Referring to FIG. 9, at step 600, the complete history of the visitor session to which the current hit was assigned is read.

There are currently two ways that the program can identify which particular advertising campaign a visitor followed to the site. One is by referrer. A referrer is the web page that held the link the visitor followed to reach the web site. For example, referring back to FIGS. 1-4, the referrer is the web page http://www.portal.com/somepage.html, which referred the remote visitor 12 to the first web site 10, www.example.com.

The second way the program can identify which particular advertising campaign a visitor followed to the site is by the entry page. The entry page is the first web page on server 10 visited; in the case of advertising campaigns, each advertising campaign can have a different entry page (all of which differ from the entry page used by visitors who are not following an advertising campaign). For example, referring to FIG. 3, the entry page on server 10 is the web page http://www.example.com/portal_ad.htm.

Regardless of the method the advertising campaign uses to determine what advertisement a visitor followed, if any, that information is available from the first hit a visitor generates at the web site. Referring back to FIG. 3, entry 11a shows both the requested page ("GET/portal_ad.htm HTTP/1.0") and the referring site ("http://www.portal.com/somepage.htm"). Thus, the program uses the first hit a visitor generates to determine what advertising campaign they followed. The entry page and referrer is assigned in step 601, and —based on this data—the ad campaign is assigned in step 603.

At step 605 the first qualification profile is read. Again, there is no concern of trying to read a non-existent object: if no qualification profiles exist, the program will not be used, since no analysis is needed. At step 610 the visitor session history (read at step 600) is compared with the requirements of the qualification levels of the current qualification profile (read at step 605). At step 615, the program checks to see if the visitor session has met all the requirements for any of the qualification levels of the current qualification profile. If it has, then at step 620 the visitor session is added to the appropriate qualification levels of the current qualification profile. Note that, in the preferred embodiment, within each qualification profile, the qualification levels are ranked, and a visitor session is added to the highest-ranking qualification level of each qualification profile for which the visitor session meets the requirements, but this limitation is not always necessary. (The preferred embodiment also ranks qualification levels: the visitor is added to the highest ranked qualification level—within each qualification profile—for which the visitor qualifies.) At step 625, whether or not the visitor session met the requirements for any of the qualification levels of the current qualification profile, the program checks to see if there are any more qualification profiles defined. If there are, then at step 630 the next qualification profile is read and control returns to step 610. Otherwise, the processing of the current hit is finished, and control reverts to step 720 in FIG. 7.

If there are remaining visitor sessions to process, the FIG. 7 routine does so in steps 725 and 730 as described above. Conversely, if there are no remaining visitor sessions left to process at step 720, control is transferred to step 735, where the return-on-investment (ROI) analysis is performed.

Before describing the ROI analysis consideration will first be given to the raw data and its format that exists after the routines of FIGS. 7-9 are run as described above. For each ad campaign, the number of visitor sessions that met each level of each qualification profile is stored in tables, as depicted in the Table A example:

TABLE A

|  | QP1 | | | QP2 | | |
| --- | --- | --- | --- | --- | --- | --- |
|  | L1 | L2 | L3 | L1 | L2 | NQ |
| ADC1 | 4 | 6 | 7 | 3 | 5 | 35 |
| ADC2 | 5 | 9 | 12 | 6 | 11 | 63 |
| ADC3 | 1 | 0 | 2 | 3 | 4 | 20 |
| NADC | 21 | 35 | 46 | 28 | 39 | 211 |

QPn—Qualification Profile n
ADCn—Ad Campaign n
NQ—Not qualified for any QP
NADC—No Ad Campaign
Ln—Qualification Level n Those visitor sessions that do not result from an as campaign that is being monitored are classified in the No-Ad-Campaign category. Those visitor sessions that do not meet the criteria of any of the Qualification Profiles are categorized in the NQ column. For each referrer, the number of visitor sessions that met each qualification profile is stored in tables, as depicted in the Table B example:

TABLE B

|  | QP1 | | | QP2 | | |
| --- | --- | --- | --- | --- | --- | --- |
|  | L1 | L2 | L3 | L1 | L2 | NQ |
| R1 | 2 | 7 | 4 | 2 | 6 | 25 |
| R2 | 4 | 2 | 16 | 2 | 11 | 83 |
| R3 | 2 | 3 | 7 | 0 | 0 | 10 |
| NR | 31 | 32 | 43 | 22 | 31 | 124 |

Rn—Referrer n
NR—No Referrer

Those visitor sessions that have no referrer are classified in the No-Referrer category. One instance in which a visitor session has no referrer arises when a visitor types in the monitored web-site address (typically a home page URL) and goes directly to the web site. All visitor sessions that do have a referrer are associated with the referrer. In other words, all referrers are tracked. When a new referrer is encountered, a new entry in the table is made.

The ROI analysis uses the following raw data: Tables A and B; the period of the report, which is the time of the first to the last records processed; the qualification profiles (FIG. 5); the ad campaigns (FIG. 6); and the nonqualified visitor value assigned to the visitor sessions that wind up in the NQ category.

Tables 1-9 below show sample output tables that can be generated by ROI analysis. These tables cross-correlate information from the raw data in various ways. For example, Table 1 shows the number of visitors referred to the web server from six different referring URLs, along with the value of the visitors referred. For each referrers, the number of visitor sessions is shown, as well as the total visitor sessions for all referrers. For each referrers, the value of the visitor sessions for each qualification level is calculated by multiplying the value from that level (FIG. 5) times the visitor sessions meeting the criteria for the qualification profile. Total value of the visitor sessions for all referrers is the sum of these products.

Various additional variables can be calculated using the raw data, and displayed in tables, additional tables, like Tables 2-9 below. Although each calculation is not described, the manner of using the raw data to generate each of the calculated variables in the tables can be easily inferred from the name of the variable in view of the following brief description of the table.

Table 2 shows the number of visitors in each qualification profile (in this instance downloading of specified products Product 1, Product 2, and Product 3), arranged by qualification level and referring URL. Table 3 shows the number of visitors from each of six advertising campaigns, broken down into qualified and non-qualified visitors, and the values the visitors generate. Although not shown, it should be noted that all untracked visitors, i.e., those not associated with a tracked ad campaign, can be summarized in the same categories as those shown in Table 3 for tracked visitors. Table 4 shows the number of visitors referred from each advertising campaign, sorted by qualification profile and qualification level. Table 5 shows visitors assigned to each qualification profile and the value they generate sorted by advertising campaign. Table 6 shows visitors for each qualification profile and the value they generated, sorted by qualification level and advertising campaign. Table 7 shows the cost of each of the six advertising campaigns and the cost per visitor for each visitor referred from the respective advertising campaigns. Table 8 shows the return on investment from each advertising campaign, where the return on investment is based on the value of the visitors referred from the respective advertising campaigns less the cost of each campaign. Finally, Table 9 shows the daily return on investment shown in Table 8.

TABLE 1

Summary of Results by Referrer

|  | Referrer | Visitor Sessions | Value of Visitors Referred |
| --- | --- | --- | --- |
| 1 | http://www.yahoo.com/ | 1303 | $3,229.50 |
| 2 | http://www.excite.com/ | 980 | $2,238.00 |
| 3 | http://www.builder.com/ | 900 | $2,511.50 |
| 4 | http://www.intergreat.com/ | 605 | $1,540.50 |
| 5 | http://www.lycos.com/ | 443 | $1,194.00 |
| 6 | http://www.hotwired.com/ | 257 | $652.50 |
|  | Total | 4488 | $11,366.00 |

TABLE 2

Top Referring Sites By Qualification Profile and Qualification Level

| | Qualification Profile | Qualification Level | Referrer | Visitor Sessions | % of Total |
|---|---|---|---|---|---|
| 1 | Product 1 | Fully Qualified | http://www.yahoo.com/ | 24 | 34.29% |
| | | | http://www.builder.com/ | 21 | 30.00% |
| | | | http://www.excite.com/ | 9 | 12.86% |
| | | | http://www.intergreat.com/ | 8 | 11.43% |
| | | | http://www.lycos.com/ | 6 | 8.57% |
| | | | http://www.hotwired.com/ | 2 | 2.86% |
| | | | Subtotal | 70 | 100.00% |
| | | Moderately Qualified | http://www.builder.com/ | 53 | 34.64% |
| | | | http://www.yahoo.com/ | 41 | 26.80% |
| | | | http://www.excite.com/ | 20 | 13.07% |
| | | | http://www.lycos.com/ | 18 | 11.76% |
| | | | http://www.intergreat.com/ | 12 | 7.84% |
| | | | http://www.hotwired.com/ | 9 | 5.88% |
| | | | Subtotal | 153 | 100.00% |
| | | Minimally Qualified | http://www.builder.com/ | 72 | 30.90% |
| | | | http://www.yahoo.com/ | 60 | 25.75% |
| | | | http://www.intergreat.com/ | 32 | 13.73% |
| | | | http://www.excite.com/ | 30 | 12.88% |
| | | | http://www.lycos.com/ | 22 | 9.44% |
| | | | http://www.hotwired.com/ | 17 | 7.30% |
| | | | Subtotal | 233 | 100.00% |
| | | Group Subtotal | | 456 | 100.00% |
| 2 | Product 2 | Fully Qualified | http://www.yahoo.com/ | 13 | 34.21% |
| | | | http://www.builder.com/ | 8 | 21.05% |
| | | | http://www.intergreat.com/ | 6 | 15.79% |
| | | | http://www.excite.com/ | 5 | 13.16% |
| | | | http://www.lycos.com/ | 4 | 10.53% |
| | | | http://www.hotwired.com/ | 2 | 5.26% |
| | | | Subtotal | 38 | 100.00% |
| | | Moderately Qualified | http://www.lycos.com/ | 23 | 31.51% |
| | | | http://www.builder.com/ | 15 | 20.55% |
| | | | http://www.intergreat.com/ | 14 | 19.18% |
| | | | http://www.yahoo.com/ | 12 | 16.44% |
| | | | http://www.excite.com/ | 9 | 12.33% |
| | | | http://www.hotwired.com/ | 0 | 0.00% |
| | | | Subtotal | 73 | 100.00% |
| | | Minimally Qualified | http://www.yahoo.com/ | 32 | 28.57% |
| | | | http://www.builder.com/ | 23 | 20.54% |
| | | | http://www.intergreat.com/ | 26 | 23.21% |
| | | | http://www.lycos.com/ | 15 | 13.39% |
| | | | http://www.excite.com/ | 10 | 8.93% |
| | | | http://www.hotwired.com/ | 6 | 5.36% |
| | | | Subtotal | 112 | 100.00% |
| | | Group Subtotal | | 223 | 100.00% |
| 3 | Product 3 | Fully Qualified | http://www.builder.com/ | 12 | 33.33% |
| | | | http://www.lycos.com/ | 9 | 25.00% |
| | | | http://www.intergreat.com/ | 7 | 19.44% |
| | | | http://www.yahoo.com/ | 4 | 11.11% |
| | | | http://www.hotwired.com/ | 13 | 8.33% |
| | | | http://www.excite.com/ | 1 | 2.78% |
| | | | Subtotal | 36 | 100.00% |
| | | Moderately Qualified | http://www.intergreat.com/ | 19 | 29.69% |
| | | | http://www.builder.com/ | 15 | 23.44% |
| | | | http://www.lycos.com/ | 13 | 20.31% |
| | | | http://www.hotwired.com/ | 11 | 17.19% |
| | | | http://www.yahoo.com/ | 6 | 9.38% |
| | | | http://www.excite.com/ | 0 | 0.00% |
| | | | Subtotal | 64 | 100.00% |
| | | Minimally Qualified | http://www.builder.com/ | 28 | 26.42% |
| | | | http://www.intergreat.com/ | 22 | 20.75% |
| | | | http://www.lycos.com/ | 21 | 19.81% |
| | | | http://www.hotwired.com/ | 16 | 15.09% |

TABLE 2-continued

Top Referring Sites By Qualification Profile and Qualification Level

| Qualification Profile | Qualification Level | Referrer | Visitor Sessions | % of Total |
|---|---|---|---|---|
| | | http://www.yahoo.com/ | 13 | 12.26% |
| | | http://www.excite.com/ | 6 | 5.66% |
| | | Subtotal | 106 | 100.00% |
| | Group Subtotal | | 206 | 100.00% |
| Total | | | 885 | 100.00% |

TABLE 3

Summary of Results by Ad Campaign

| | Ad Campaign | Non-Qualified Visitor Sessions | Non-Qualified Visitor Value | Qualified Visitor Sessions | Qualified Visitor Average Value | Qualified Visitors Total Value | Total Visitor Sessions | Visitor Average Value | Total Visitor Value |
|---|---|---|---|---|---|---|---|---|---|
| 1 | Yahoo! Banner | 1098 | $2,196.00 | 205 | $5.04 | $1,033.50 | 1303 | $2.48 | $3,229.50 |
| 2 | Builder.com Banner | 653 | $1,306.00 | 247 | $4.88 | $1,205.50 | 900 | $2.79 | $2,511.50 |
| 3 | Excite Banner | 890 | $1,780.00 | 90 | $5.09 | $458.00 | 980 | $2.28 | $2,238.00 |
| 4 | Intergreat Banner | 459 | $918.00 | 146 | $4.26 | $622.50 | 605 | $2.55 | $1,540.50 |
| 5 | Lycos Banner | 312 | $624.00 | 131 | $4.35 | $570.00 | 443 | $2.70 | $1,194.00 |
| 6 | HotWired WebMonkey Banner | 193 | $386.00 | 64 | $4.16 | $266.50 | 257 | $2.54 | $652.50 |
| | Total | 3605 | $7,210.00 | 883 | $4.71 | $4,156.00 | 4488 | $2.53 | $11,366.00 |

TABLE 4

Results by Ad Campaign, Qualification Profile and Qualification Level

| | Ad Campaign | Qualification Profile | Qualification Level | Visitor Sessions | % of Visitor Sessions | Value |
|---|---|---|---|---|---|---|
| 1 | Yahoo! Banner | Product 1 | Fully Qualified | 24 | 1.84% | $192.00 |
| | | | Moderately Qualified | 41 | 3.15% | $246.00 |
| | | | Minimally Qualified | 60 | 4.60% | $300.00 |
| | | Product 2 | Fully Qualified | 13 | 1.00% | $78.00 |
| | | | Moderately Qualified | 12 | 0.92% | $48.00 |
| | | | Minimally Qualified | 32 | 2.46% | $96.00 |
| | | Product 3 | Fully Qualified | 4 | 0.31% | $20.00 |
| | | | Moderately Qualified | 6 | 0.46% | $21.00 |
| | | | Minimally Qualified | 13 | 1.00% | $32.50 |
| | | Non-Qualified | | 1098 | 84.27% | $2,196.00 |
| | | Subtotal | | 1303 | 100.00% | $3,229.50 |
| 2 | Excite Banner | Product 1 | Fully Qualified | 9 | 0.92% | $72.00 |
| | | | Moderately Qualified | 20 | 2.04% | $120.00 |
| | | | Minimally Qualified | 30 | 3.06% | $150.00 |
| | | Product 2 | Fully Qualified | 5 | 0.51% | $30.00 |
| | | | Moderately Qualified | 9 | 0.92% | $36.00 |
| | | | Minimally Qualified | 10 | 1.02% | $30.00 |
| | | Product 3 | Fully Qualified | 1 | 0.10% | $5.00 |
| | | | Moderately Qualified | 0 | 0.00% | $0.00 |
| | | | Minimally Qualified | 6 | 0.61% | $15.00 |
| | | Non-Qualified | | 890 | 90.82% | $1,780.00 |
| | | Subtotal | | 980 | 100.00% | $2,238.00 |
| 3 | Builder.com Banner | Product 1 | Fully Qualified | 21 | 2.33% | $168.00 |
| | | | Moderately Qualified | 53 | 5.89% | $318.00 |
| | | | Minimally Qualified | 72 | 8.00% | $360.00 |
| | | Product 2 | Fully Qualified | 8 | 0.89% | $48.00 |
| | | | Moderately Qualified | 15 | 1.67% | $60.00 |
| | | | Minimally Qualified | 23 | 2.56% | $69.00 |

TABLE 4-continued

Results by Ad Campaign, Qualification Profile and Qualification Level

| Ad Campaign | Qualification Profile | Qualification Level | Visitor Sessions | % of Visitor Sessions | Value |
|---|---|---|---|---|---|
| | | Product 3 | Fully Qualified | 12 | 1.33% | $60.00 |
| | | | Moderately Qualified | 15 | 1.67% | $52.50 |
| | | | Minimally Qualified | 28 | 3.11% | $70.00 |
| | Non-Qualified | | 653 | 72.56% | $1,306.00 |
| | Subtotal | | 900 | 100.00% | $2,511.50 |
| 4 Intergreat Banner | Product 1 | Fully Qualified | 8 | 1.32% | $64.00 |
| | | Moderately Qualified | 12 | 1.98% | $72.00 |
| | | Minimally Qualified | 32 | 5.29% | $160.00 |
| | Product 2 | Fully Qualified | 6 | 0.99% | $36.00 |
| | | Moderately Qualified | 14 | 2.31% | $56.00 |
| | | Minimally Qualified | 26 | 4.30% | $78.00 |
| | Product 3 | Fully Qualified | 7 | 1.16% | $35.00 |
| | | Moderately Qualified | 19 | 3.14% | $66.50 |
| | | Minimally Qualified | 22 | 3.64% | $55.00 |
| | Non-Qualified | | 459 | 75.87% | $918.00 |
| | Subtotal | | 605 | 100.00% | $1,540.50 |
| 5 Lycos Banner | Product 1 | Fully Qualified | 6 | 1.35% | $48.00 |
| | | Moderately Qualified | 18 | 4.06% | $108.00 |
| | | Minimally Qualified | 22 | 4.97% | $110.00 |
| | Product 2 | Fully Qualified | 4 | 0.90% | $24.00 |
| | | Moderately Qualified | 23 | 5.19% | $92.00 |
| | | Minimally Qualified | 15 | 3.39% | $45.00 |
| | Product 3 | Fully Qualified | 9 | 2.03% | $45.00 |
| | | Moderately Qualified | 13 | 2.93% | $45.50 |
| | | Minimally Qualified | 21 | 4.74% | $52.50 |
| | Non-Qualified | | 312 | 70.43% | $624.00 |
| | Subtotal | | 443 | 100.00% | $1,194.00 |
| 6 HotWired WebMonkey Banner | Product 1 | Fully Qualified | 2 | 0.78% | $16.00 |
| | | Moderately Qualified | 9 | 3.50% | $54.00 |
| | | Minimally Qualified | 17 | 6.61% | $85.00 |
| | Product 2 | Fully Qualified | 0 | 0.00% | $0.00 |
| | | Moderately Qualified | 0 | 0.00% | $0.00 |
| | | Minimally Qualified | 6 | 2.33% | $18.00 |
| | Product 3 | Fully Qualified | 3 | 1.17% | $15.00 |
| | | Moderately Qualified | 11 | 4.28% | $38.50 |
| | | Minimally Qualified | 16 | 6.23% | $40.00 |
| | Non-Qualified | | 193 | 75.10% | $386.00 |
| | Subtotal | | 257 | 100.00% | $652.50 |
| Total | | | 4488 | 100.00% | $11,366.00 |

TABLE 5

Results by Qualification Profile

| Qualification Profile | Ad Campaign | Qualified Visitor Sessions | % of Visitor Sessions | Value | % of Value |
|---|---|---|---|---|---|
| 1 Product 1 | Builder.com Banner | 146 | 32.02% | $846.00 | 32.01% |
| | Yahoo! Banner | 125 | 27.41% | $738.00 | 27.92% |
| | Excite Banner | 59 | 12.94% | $342.00 | 12.94% |
| | Intergreat Banner | 52 | 11.40% | $296.00 | 11.20% |
| | Lycos Banner | 46 | 10.09% | $266.00 | 10.06% |
| | HotWired WebMonkey Banner | 28 | 6.14% | $155.00 | 5.86% |
| Subtotal | | 456 | 100.00% | $2,643.00 | 100.00% |
| 2 Product 2 | Yahoo! Banner | 57 | 25.79% | $222.00 | 26.30% |
| | Builder.com Banner | 46 | 20.81% | $177.00 | 20.97% |
| | Intergreat Banner | 46 | 20.81% | $170.00 | 20.14% |
| | Lycos Banner | 42 | 19.00% | $161.00 | 19.08% |
| | Excite Banner | 24 | 10.86% | $96.00 | 11.37% |
| | HotWired WebMonkey Banner | 6 | 2.71% | $18.00 | 2.13% |
| Subtotal | | 221 | 100.00% | $844.00 | 100.00% |

TABLE 5-continued

Results by Qualification Profile

| Qualification Profile | Ad Campaign | Qualified Visitor Sessions | % of Visitor Sessions | Value | % of Value |
|---|---|---|---|---|---|
| 3 Product 3 | Builder.com Banner | 55 | 26.70% | $182.50 | 27.28% |
|  | Intergreat Banner | 48 | 23.30% | $156.50 | 23.39% |
|  | Lycos Banner | 43 | 20.87% | $143.00 | 21.38% |
|  | HotWired WebMonkey Banner | 30 | 14.56% | $93.50 | 13.98% |
|  | Yahoo! Banner | 23 | 11.17% | $73.50 | 10.99% |
|  | Excite Banner | 7 | 3.40% | $20.00 | 2.99% |
|  | Subtotal | 206 | 100.00% | $669.00 | 100.00% |

TABLE 6

Results by Qualification Profile and Qualification Level

| Qualification Profile | Qualification Level | Ad Campaign | Visitor Sessions | % of Visitor Sessions | Visitor Value | % of Visitor Value |
|---|---|---|---|---|---|---|
| 1 Product 1 | Fully Qualified | Yahoo! Banner | 24 | 34.29% | $192.00 | 34.29% |
|  |  | Builder.com Banner | 21 | 30.00% | $168.00 | 30.00% |
|  |  | Excite Banner | 9 | 12.86% | $72.00 | 12.86% |
|  |  | Intergreat Banner | 8 | 11.43% | $64.00 | 11.43% |
|  |  | Lycos Banner | 6 | 8.57% | $48.00 | 8.57% |
|  |  | HotWired WebMonkey Banner | 2 | 2.86% | $16.00 | 2.86% |
|  |  | Subtotal | 70 | 100.00% | $560.00 | 100.00% |
|  | Moderately Qualified | Builder.com Banner | 53 | 34.64% | $318.00 | 34.64% |
|  |  | Yahoo! Banner | 41 | 26.80% | $246.00 | 26.80% |
|  |  | Excite Banner | 20 | 13.07% | $120.00 | 13.07% |
|  |  | Lycos Banner | 18 | 11.76% | $108.00 | 11.76% |
|  |  | Intergreat Banner | 12 | 7.84% | $72.00 | 7.84% |
|  |  | HotWired WebMonkey Banner | 9 | 5.88% | $54.00 | 5.88% |
|  |  | Subtotal | 153 | 100.00% | $918.00 | 100.00% |
|  | Minimally Qualified | Builder.com Banner | 72 | 30.90% | $360.00 | 30.90% |
|  |  | Yahoo! Banner | 60 | 25.75% | $300.00 | 25.75% |
|  |  | Intergreat Banner | 32 | 13.73% | $160.00 | 13.73% |
|  |  | Excite Banner | 30 | 12.88% | $150.00 | 12.88% |
|  |  | Lycos Banner | 22 | 9.44% | $110.00 | 9.44% |
|  |  | HotWired WebMonkey Banner | 17 | 7.30% | $85.00 | 7.30% |
|  |  | Subtotal | 233 | 100.00% | $1,165.00 | 100.00% |
|  | Total |  | 456 | — | $2,643.00 | — |
| 2 Product 2 | Fully Qualified | Yahoo! Banner | 13 | 36.11% | $78.00 | 36.11% |
|  |  | Builder.com Banner | 8 | 22.22% | $48.00 | 22.22% |
|  |  | Intergreat Banner | 6 | 16.67% | $36.00 | 16.67% |
|  |  | Excite Banner | 5 | 13.89% | $30.00 | 13.89% |
|  |  | Lycos Banner | 4 | 11.11% | $24.00 | 11.11% |
|  |  | HotWired WebMonkey Banner | 0 | 0.00% | $0.00 | 0.00% |
|  |  | Subtotal | 36 | 100.00% | $216.00 | 100.00% |
|  | Moderately Qualified | Lycos Banner | 23 | 31.51% | $92.00 | 31.51% |
|  |  | Builder.com Banner | 15 | 20.55% | $60.00 | 20.55% |
|  |  | Intergreat Banner | 14 | 19.18% | $56.00 | 19.18% |
|  |  | Yahoo! Banner | 12 | 16.44% | $48.00 | 16.44% |
|  |  | Excite Banner | 9 | 12.33% | $36.00 | 12.33% |
|  |  | HotWired WebMonkey Banner | 0 | 0.00% | $0.00 | 0.00% |
|  |  | Subtotal | 73 | 100.00% | $292.00 | 100.00% |
|  | Minimally Qualified | Yahoo! Banner | 32 | 28.57% | $96.00 | 28.57% |
|  |  | Intergreat Banner | 26 | 23.21% | $78.00 | 23.21% |
|  |  | Builder.com Banner | 23 | 20.54% | $69.00 | 20.54% |
|  |  | Excite Banner | 10 | 8.93% | $30.00 | 8.93% |
|  |  | Lycos Banner | 15 | 13.39% | $45.00 | 13.39% |
|  |  | HotWired WebMonkey Banner | 6 | 5.36% | $18.00 | 5.36% |
|  |  | Subtotal | 112 | 100.00% | $336.00 | 100.00% |
|  | Total |  | 221 | — | $844.00 | — |

TABLE 6-continued

Results by Qualification Profile and Qualification Level

| | Qualification Profile | Qualification Level | Ad Campaign | Visitor Sessions | % of Visitor Sessions | Visitor Value | % of Visitor Value |
|---|---|---|---|---|---|---|---|
| 3 | Product 3 | Fully Qualified | Builder.com Banner | 12 | 33.33% | $60.00 | 33.33% |
| | | | Lycos Banner | 9 | 25.00% | $45.00 | 25.00% |
| | | | Intergreat Banner | 7 | 19.44% | $35.00 | 19.44% |
| | | | Yahoo! Banner | 4 | 11.11% | $20.00 | 11.11% |
| | | | HotWired WebMonkey Banner | 3 | 8.33% | $15.00 | 8.33% |
| | | | Excite Banner | 1 | 2.78% | $5.00 | 2.78% |
| | | | Subtotal | 36 | 100.00% | $180.00 | 100.00% |
| | | Moderately Qualified | Intergreat Banner | 19 | 29.69% | $66.50 | 29.69% |
| | | | Builder.com Banner | 15 | 23.44% | $52.50 | 23.44% |
| | | | Lycos Banner | 13 | 20.31% | $45.50 | 20.31% |
| | | | HotWired WebMonkeyBanner | 11 | 17.19% | $38.50 | 17.19% |
| | | | Yahoo! Banner | 6 | 9.38% | $21.00 | 9.38% |
| | | | Excite Banner | 0 | 0.00% | $0.00 | 0.00% |
| | | | Subtotal | 64 | 100.00% | $224.00 | 100.00% |
| | | Minimally Qualified | Builder.com Banner | 28 | 26.42% | $70.00 | 26.42% |
| | | | Intergreat Banner | 22 | 20.75% | $55.00 | 20.75% |
| | | | Lycos Banner | 21 | 19.81% | $52.50 | 19.81% |
| | | | HotWired WebMonkey Banner | 16 | 15.09% | $40.00 | 15.09% |
| | | | Yahoo! Banner | 13 | 12.26% | $32.50 | 12.26% |
| | | | Excite Banner | 6 | 5.66% | $15.00 | 5.66% |
| | | | Subtotal | 106 | 100.00% | $265.00 | 100.00% |
| | | | Total | 206 | — | $669.00 | — |

TABLE 7

Ad Campaign Costs

| | Ad Campaign | Cost This Period | Total Visitor Sessions | Cost Per Visitor | Qualified Visitor Sessions | Cost Per Qualified Visitor |
|---|---|---|---|---|---|---|
| 1 | Yahoo! Banner | $1,250.00 | 1303 | $0.96 | 205 | $6.10 |
| 2 | Excite Banner | $433.00 | 980 | $0.44 | 90 | $4.81 |
| 3 | Builder.com Banner | $1,250.00 | 900 | $1.39 | 247 | $5.06 |
| 4 | Intergreat Banner | $200.00 | 605 | $0.33 | 146 | $1.37 |
| 5 | Lycos Banner | $2,000.00 | 443 | $4.51 | 131 | $15.27 |
| 6 | HotWired WebMonkey Banner | $1,250.00 | 257 | $4.86 | 64 | $19.53 |
| | Total | $6,383.00 | 4488 | $1.42 | 883 | $7.23 |

TABLE 8

Ad Campaign Return on Investment

| | Ad Campaign | # Days Active This Period | Cost of Campaign This Period | Total Visitor Value Generated | ROI This Period | % ROI This Period |
|---|---|---|---|---|---|---|
| 1 | Yahoo! Banner | 7 | $1,250.00 | $3,229.50 | $1,979.50 | 158.36% |
| 2 | Excite Banner | 16 | $433.00 | $2,238.00 | $1,805.00 | 416.86% |
| 3 | Intergreat Banner | 5 | $200.00 | $1,540.50 | $1,340.50 | 670.25% |
| 4 | Builder.com Banner | 7 | $1,250.00 | $2,511.50 | $1,261.50 | 100.92% |
| 5 | HotWired WebMonkey Banner | 9 | $1,250.00 | $652.50 | ($597.50) | −47.80% |
| 6 | Lycos Banner | 12 | $2,000.00 | $1,194.00 | ($806.00) | −40.30% |
| | Total | — | $6,383.00 | $11,366.00 | $4,983.00 | 78.07% |

TABLE 9

Ad Campaign Daily Return on Investment

| | Ad Campaign | # Days Active This Period | Cost Per Day | Visitor Value Per Day | ROI Per Day |
|---|---|---|---|---|---|
| 1 | Yahoo! Banner | 7 | $178.57 | $461.36 | $282.79 |
| 2 | Intergreat Banner | 5 | $40.00 | $308.10 | $268.10 |
| 3 | Builder.com Banner | 7 | $178.57 | $358.79 | $180.21 |
| 4 | Excite Banner | 16 | $27.06 | $139.88 | $112.81 |
| 5 | HotWired WebMonkey Banner | 9 | $138.89 | $72.50 | ($66.39) |
| 6 | Lycos Banner | 12 | $166.67 | $99.50 | ($67.17) |
| | Total | — | $563.09 | $1,340.62 | $777.52 |

Figure 10:
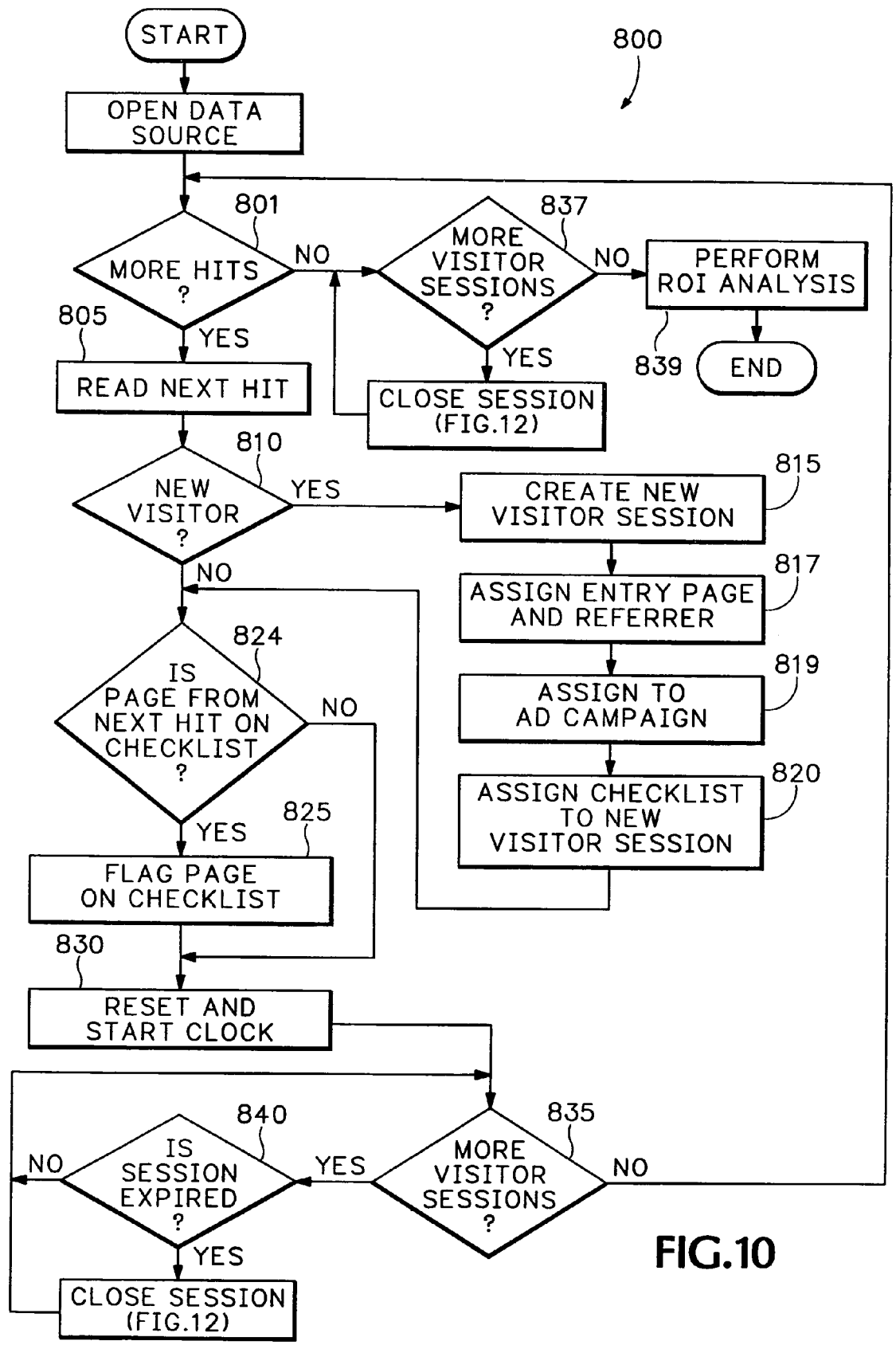
FIG. 10 is a second embodiment that shows a flow diagram for processing traffic records offline from a data source, such as a log file, evaluating the traffic, and correlating the value to any corresponding ad campaigns.
Figure 11:
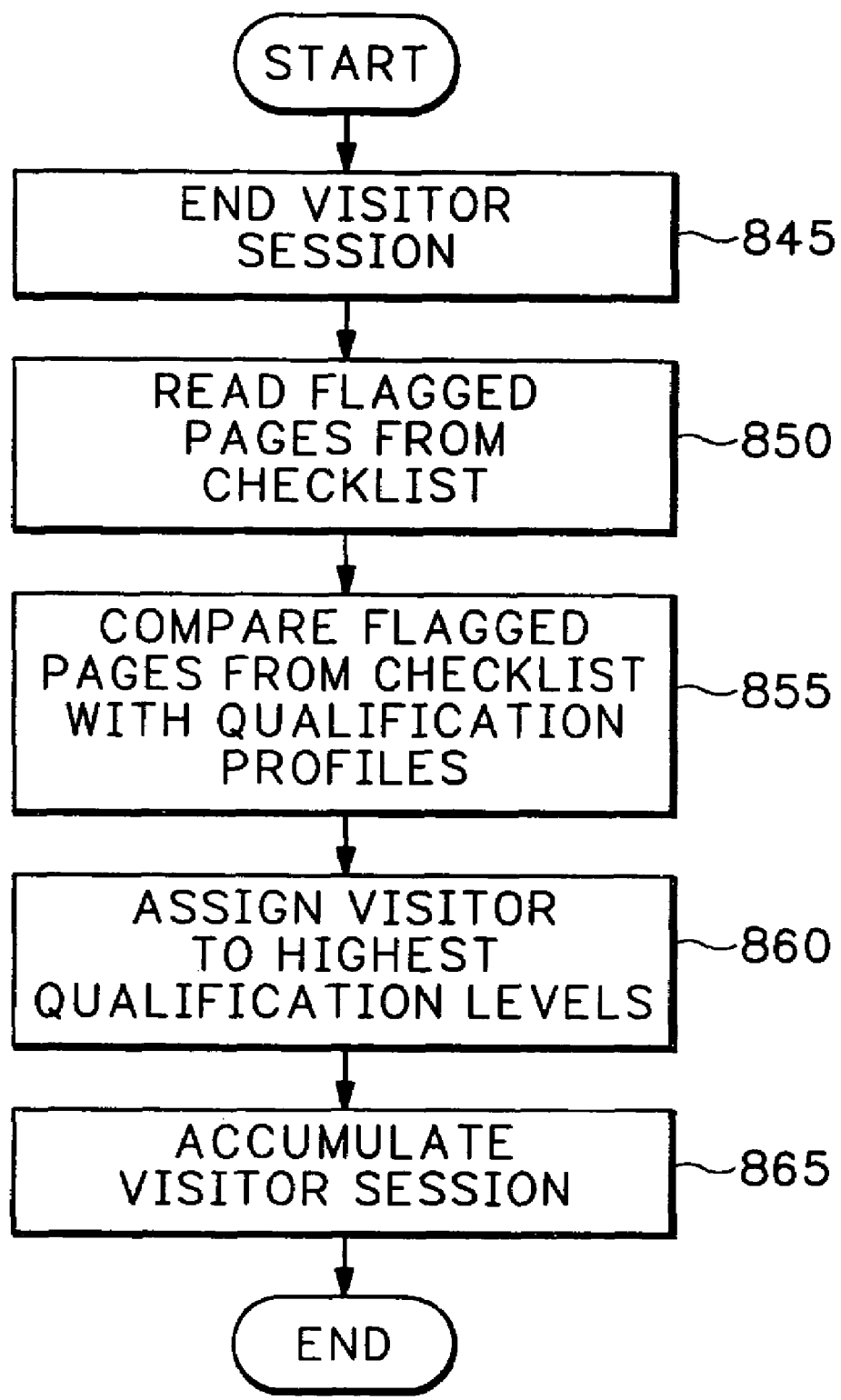
FIG. 11 shows a flow diagram for closing and accumulating visitor sessions in the second embodiment.

Turning now to FIGS. 10 and 11, illustrated therein is a flow chart, indicated generally as program 800, depicting steps in a computer program constructed in accordance with the present invention. As is the case with the previously described programs, program 800 operates on server 10 in the present embodiment of the invention, although this is not required.

Program 800 is advantageous in that it tracks only criteria of interest for each active visitor session and—at the conclusion of each session—determines whether the visitor whose session was monitored meets the criteria for each qualification profile. And if so, the program assigns the visitor accordingly. This naturally requires less processing and memory resources than program 700.

Turning now to FIG. 10, in step 801, the program checks to see if there are more hits in the log file. If so, in step 805, the program reads the next hit generated by interaction of a remote visitor with server 10. If it is a hit from a new visitor, i.e., there is no visitor session active for the particular visitor who produced the current hit, a new visitor session is created in step 815. At the same time, the visitor session is assigned to an entry page and referrer and to an ad campaign in steps 817, 819, respectively, as described above. Thereafter, a checklist is assigned to the new visitor session in 820. The checklist is merely a list of all of the requirements for each qualification level in each qualification profile. In the case where criteria for each of the requirements are selected web pages identified by URLs on the site, the checklist assigned to each visitor session in step 820 is merely a list of all of those URLs.

Returning again to step 810, if there is a visitor session active for the particular visitor who produced the current hit, that visitor's session is updated. When a visitor session is updated responsive to a current hit from that visitor, the information in the hit is examined to determine whether or not any of the URLs on the checklist were visited and, if so, that URL is flagged. In the present embodiment of the invention, the same checklist is assigned to each visitor session.

This process begins in step 824 when the hit is examined to determine whether or not the page is on the checklist. If so, that page on the list is flagged in step 825, and a session timing clock, which is unique to each visitor session, is reset and started in step 830. If not, the program moves from step 824 to step 830 to reset and start the clock associated with that visitor session. In other words, every hit from the visitor resets and starts the clock in step 830 whether the visitor views a page on the checklist or not. After resetting and starting the clock, the program—in step 835—checks each open visitor session. For each session, in step 840, the program determines whether the clock associated with that visitor session has timed out. Put differently, it determines whether the predetermined time used to define each visitor session has lapsed without another hit from that visitor. If not, the program leaves the visitor session open and returns control to step 835 to check the next visitor session. If the session has lapsed, the program closes that session in accordance with FIG. 11, which is described shortly, and returns control to step 835 to check the next session. After all current sessions are checked using the routine in steps 835, 840, and FIG. 11, control is transferred again to step 801 to check for more hits, as described above.

When there are no more hits in the log file, control transfers to decision box 837, which checks all remaining open visitor sessions and closes each in accordance with FIG. 11. Each time a session is closed, control again returns to step 837 to close the next visitor session until all are closed by the FIG. 11 routine. Control then goes to step 839, wherein the ROI analysis is performed in the same manner as described in connection with the embodiment of FIGS. 7-9.

Turning now to FIG. 11, consideration will be given to the manner in which a visitor session is closed. With reference to FIG. 10, this occurs after step 840, when each session expires, and after step 801, when there are no more hits to process and all remaining visitor sessions are consequently closed. In steps 845, 850, the session is closed, and the checklist associated with the session is examined to determine which pages the visitor viewed during the visitor session. In step 855 the flagged pages are compared with the pages designated in each qualification level within each qualification profile. In step 860, the visitor is assigned to the highest qualification level, like qualification level 315 in FIG. 5, in each qualification profile, like qualification profile 305 in FIG. 5, for which she qualifies. This is accomplished in the same manner as described in connection with FIG. 9. Next, in step 865, Tables A and B are updated accordingly. It is from these tables that data are extracted, as described above, to produce tables like those shown in Tables 1-9 above.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

We claim:

1. A method for associating visitor profiles with products or services comprising:
   establishing a visitor profile for each visitor to one or more web servers;
   defining a plurality of qualification levels to visitors of one or more URLs associated with the one or more web servers;
   associating each of the plurality of qualification levels with products or services, at least two of the qualification levels being associated with different levels of interest in the same product or service; and
   analyzing visitor profiles to associate each visitor with one or more of the plurality of qualification levels, wherein the establishing, defining, associate, and analyzing steps take place within a computer.

2. The method of claim 1 wherein each qualification level represents a different level of interest in a product or service offered for sale at the one or more web servers.

3. The method of claim 1 wherein analyzing visitor profiles comprises:
   determining which URLs on the one or more web servers each visitor visited; and
   assigning each visitor to one or more of the plurality of qualification levels based on the URLs visited by the visitor.

4. The method of claim 1 wherein associating each visitor with one or more of the plurality of qualification level comprises:
   comparing each visitor with criteria defining each qualification level; and
   associating each visitor with one or more qualification levels whose criteria the visitor meets.

5. The method of claim 1 wherein establishing a visitor profile for each visitor comprises creating a visitor session to record hits associated with the visitor, where each hit corresponds to data exchanged between the one or more web servers and a computing device associated with the visitor.

6. The method of claim 1 wherein said method further comprises assigning a quantitative value to each of the plurality of qualification levels.

7. The method of claim 1 wherein analyzing visitor profiles comprises:
   determining which URLs on the one or more web servers each visitor visited; and
   assigning each visitor to one or more of the plurality of qualification levels based on the URLs visited by the visitor.

8. The method of claim 1 wherein associating each visitor with one or more of the plurality of qualification level comprises:
   comparing each visitor with criteria defining each qualification level; and
   associating each visitor with one or more qualification levels whose criteria the visitor meets.

9. The method of claim 1 wherein establishing a visitor profile for each visitor comprises creating a visitor session to record hits associated with the visitor, where each hit corresponds to data exchanged between the one or more web servers and a computing device associated with the visitor.

10. The method of claim 1 wherein said method further comprises assigning a quantitative value to each of the plurality of qualification levels.

\* \* \* \* \*